June 3, 1969 — S. A. BLAIR — 3,447,710
MANUALLY REMOVABLE TEAR-TYPE CLOSURE ELEMENTS
Original Filed May 3, 1965

STANLEY A. BLAIR
INVENTOR.
ATTORNEY

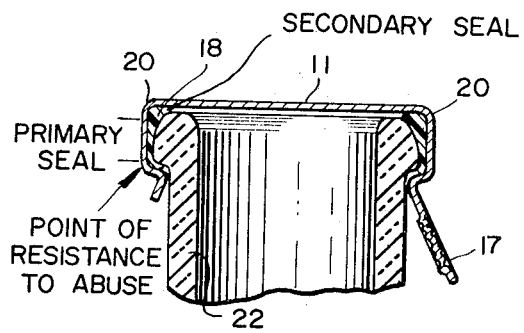
FIG. 5
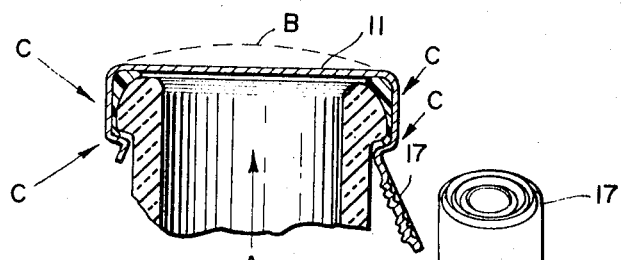
FIG. 6
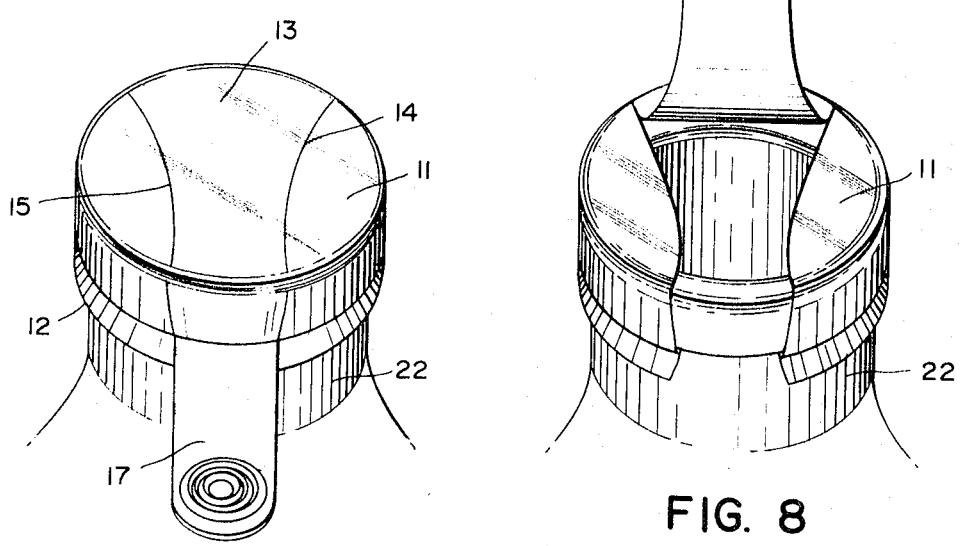
FIG. 7
FIG. 8

United States Patent Office 3,447,710
Patented June 3, 1969

3,447,710
MANUALLY REMOVABLE TEAR-TYPE
CLOSURE ELEMENTS
Stanley A. Blair, Malden, Mass., assignor to W. R. Grace & Co., Cambridge, Mass., a corporation of Connecticut
Original application May 3, 1965, Ser. No. 456,029, which is a continuation-in-part of application Ser. No. 419,637, Dec. 21, 1964. Divided and this application Aug. 15, 1967, Ser. No. 671,178
Int. Cl. B65d 23/00, 53/02, 43/02
U.S. Cl. 215—40      5 Claims

ABSTRACT OF THE DISCLOSURE

A tear off closure for containers which includes a sealing gasket positioned substantially exclusively on the inner surface of the skirt of the closure. A suitable gasket is composed of a fluxed plastisol of a vinyl chloride resin having a cellular structure. Because the gasket is solely on the inner surface of the skirt, the possibility of fracturing the scored section of the closure while capping a container is reduced.

---

This application is a division of abandoned application Ser. No. 456,029, filed May 3, 1965, which in turn is a continuation-in-part of abandoned application Ser. No. 419,637, filed on Dec. 21, 1964.

This invention relates to closure elements. In one aspect it relates to closures which are used to seal and protect the contents of containers packed under pressure in which the sealing gasket resides in the skirt. In a particular aspect it relates to closures which are provided with tear-tabs for manually removing such closures from containers.

Bottled beer and other carbonated beverages are provided with an air-tight pressure crown seal to retain the carbonation and to protect the contents against contamination. Crowns for such bottles are made of metal which is of uniform ductility, gage and even temper and are provided with a sealing gasket, such as cork, fluxed plastisols, polyethylene and other plastic materials. In the capping operation, the skirt of the crown is crimped around the locking ring of the glass bottle to form a highly effective seal.

Mechanical devices, such as hand-operated openers, are necessary to remove the crown from the bottle. These openers are not always readily available much to the dissatisfaction of the consumer. To avoid the need of such devices, a number of closures have been made available whereby the closure can be easily removed solely by manual operation. These include, among others, tabs and keys integrated with the closure to assist in tearing a selected portion of the closure and thereafter separating the torn closure from the mouth of the bottle.

While such closures can be removed from bottles by purely manual operations, they are, nevertheless, still subject to some criticism. For example, some closures have structures which are markedly different from conventional crown bottle caps and are exepnsive to produce. In addition, because of the structural differences they cannot be applied to bottles by conventional capping equipment. A significant disadvantage is that the sealing gasket is positioned in the closure so that it seats directly over the lip of the container. In such position, the gas pressure within the bottle tends to lift the closure and gasket from the bottle thereby contributing to leakage. In addition, some closures are provided with score lines traversing the center panel to facilitate tearing the closure from a bottle. Because the sealing gasket is adapted to seat on the mouth of the container, the compression involved in the crimping step forces the gasket against the periphery of the panel with the result that the score lines are subject to rupturing.

It is, therefore, an object of this invention to provide a closure for bottles and like containers for carbonated liquids whereby the closure maintains a permanent seal under pressure. In one embodiment, the invention provides a manual tear-type closure which is effective for sealing a bottle against internal pressure wherein the sealing element has a specific placement in the closure shell. In a further embodiment, the invention provides a composition having the desirable properties for specifically placing the sealing gasket on the internal surface of the skirt of the closure shell.

The invention comprises a closure element for sealing containers comprising a shell having a central panel and a skirt depending from the periphery thereof. The shell is provided with a tear section extending from the peripheral edge of the skirt for a distance across the central panel and a tab operatively associated with the tear section adapted for manually tearing the closure for easy removal from the container. A gasket is positioned on the inner surface on the skirt of the closure to seal the container to preserve its contents.

The gasket is sufficiently resilient so that it readily accommodates itself to any irregularities which may exist in the container surface. The specific placement of the gasket in the shell contributes substantially to the elimination of score line rupture when the closure is subjected to high head pressures in the capping operation. In addition, the internal pressure within the container raises the panel of the closure in dome-like fashion causing the skirt of the closure to flex inwardly with a consequent compression of the gasket around the mouth of the container thereby assuring an effective seal at all times. This action differs from the conventional top or lip seal where the pressure raises the gasket from the lip causing a space to appear between the container and closure through which leakage occurs. A further advantage of positioning the gasket in the skirt is that such placement provides resistance to twisting or turning of the closure as a result of the constant pressure which is inwardly exerted against it by the skirt.

In the drawing:

FIG. 5 is a cross-sectional view of a closure in sealed relationship with a vertical sectional view of the neck of a bottle.

FIG. 6 shows the closure and gasket in cross section in sealed relationship with the mouth of a container and illustrates the doming effect of the panel of the closure due to the internal pressure exerted thereon.

FIG. 7 is a perspective fragmentary view of a closure having a tear-tab shown in sealed engagement with a bottle.

FIG. 8 is a view similar to FIG. 7 showing the tear section pulled away from the panel of the closure.

Figure 1:
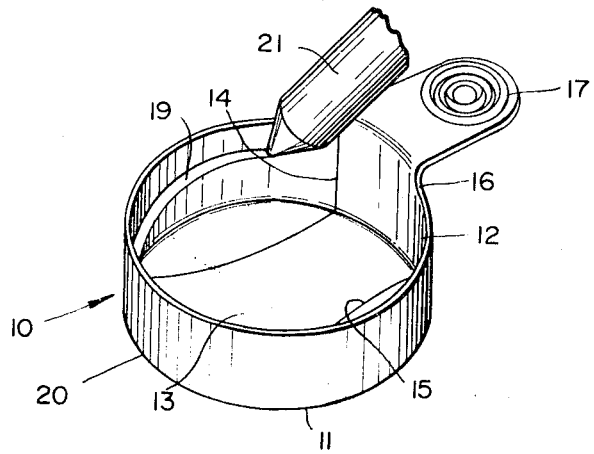
FIG. 1 is a perspective view showing the application of the gasket-forming composition as a continuous thin strip to the inner surface of the skirt of a closure by means of a nozzle.

In the drawing, the closure shown generally at 10, is comprised of a central panel 11 and a skirt 12 depending from the periphery of the panel. The closure is provided with a tear section 13, shown in FIGS. 1, 7 and 8, and consists of a pair of spaced opposed lines 14 and 15 which are scored on the closure commencing from the free edge 16 of the skirt 12 and continuing for a distance across the panel 11. Alternately, the tear secton 13 may be defined by a pair of interrupted instead of continuous score lines. A tab 17, being an outward extension of the free edge of the skirt, is positioned between the tear lines 14 and 15.

The closure is provided with a gasket 18 which is adhered to the inner surface of the closure shell and resides in the skirt. The gasket 18 is formed in the closure by a method which is illustrated in FIG. 1. In this method, a closure shell 10 of a flexible metal, such as aluminum, aluminum alloy or tinplate, is provided having a thickness of about 8 to 15 mils and having its inner surface coated with a protective film of a lacquer or varnish. A thin encircling strip 19 of a suitable liquid gasket-forming composition, such as a vinyl resin plastisol, is applied at a point intermediate the free edge 16 of the closure skirt 12 and the juncture 20 where the opposed edge of the skirt and the peripheral margin of the panel 11 merge. The strip 19 is applied to the surface of the skirt, as the closure is spun by means of a fixed nozzle 21 which is connected to a supply source (not shown) of the gasket-forming composition.

The rheological properties of the liquid composition are such that it stays fixed in the position where it was applied to the skirt. To achieve such fixation, the composition should be very fluid at high shear rates to permit ease of application through the nozzle, but it should have a higher viscosity at low shear rates to hold its configuration in the closure. The viscosity of the composition which meets the criteria ranges from about 2,000 to 4,000, preferably 2,500 to 3,500, centipoises at 60 r.p.m. and about 8,000 to 14,000, preferably 8,000 to 11,000, centipoises at 6 r.p.m. as measured at 110° F. on a Brookfield viscosimeter, Model LVT5X, No. 3 spindle. A low viscosity at 60 r.p.m. requires that the composition have a high viscosity at 6 r.p.m. Conversely, a high viscosity at 60 r.p.m. requires that the composition have a low viscosity at 6 r.p.m.

After the strip of composition has been applied to the inner surface of the skirt, the lined closure is then moved by suitable means, such as a conveyor, to a heated oven to solidify the composition. As the composition is heated, it flows due to a reduction in viscosity. This action is induced by incorporating into the composition a small amount of wax, preferably of the paraffin type for taste reasons, of the order of about 3 to 7 per hundred parts of resin. The desired flow is not obtained when less than 3 parts are used, and excess blooming, which results in twisting of the closure, and taste problems are encountered when amounts are used in excess of 7 parts. The wax melts at a temperature above the lining temperature of the composition, thus decreasing the viscosity when heated in the oven.

Figure 2:
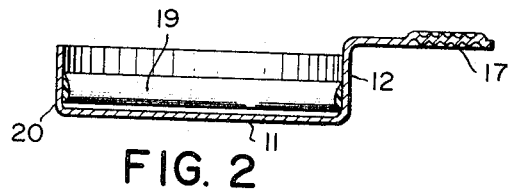
FIG. 2 is a cross-sectional view of the gasket-forming composition after it had ceased to flow.
Figure 3:
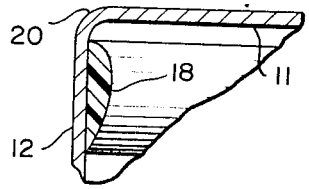
FIG. 3 is a fragmentary sectional view of a closure showing a gasket positioned therein before the closure is applied in sealing engagement with a container.
Figure 4:
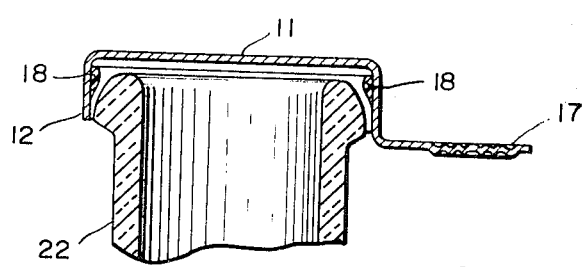
FIG. 4 is a diametrical sectional view of a closure and gasket prior to seating on the mouth of a bottle for sealing engagement therewith.

The reduction in viscosity causes the liquid composition to gravitate progressively downward in a direction towards the juncture of the skirt and panel where it is immobilized against further flow, as illustrated in FIG. 2. When the composition has completed its downward flow, it covers the area from a midpoint of the skirt down to the skirt-panel juncture. After treatment in an oven, the composition solidifies to a resilient gasket which appears in cross-section as a teardrop as illustrated in FIG. 3.

The amount of composition used and its specific placement in the closure influence the sealing efficiency of the resulting gasket and its effect on score line rupture. It has been discovered that an efficient seal is obtained, using the aforementioned placement, when the cross-sectional area of the gasket is between 1 mm.$^2$ and 5 mm.$^2$. Good sealing coupled with favorable economics are achieved when the cross-sectional area ranges between about 1 mm.$^2$ and 2.5 mm.$^2$. A cross-sectional area less than 1 mm.$^2$ does not provide an efficient seal and when greater than 5 mm.$^2$ it leads to rupturing of the score lines during the capping operation.

To determine the specific amount of composition necessary to achieve the desired results using the aforementioned guide lines, one would take into account the size of the closure and the final density of the sealing composition. The circumference of the closure, obtained by multiplying its diameter by pi, is multiplied by the desired cross-sectional area between 1 mm.$^2$ and 5 mm.$^2$ to obtain the total volume of composition required for sealing efficiency. This volume, multiplied by the final density of the composition, results in the weight of composition to be used to gasket the closure. To illustrate, a cap having a diameter of 26 mm. would have a circumference of approximately 82 mm. and a gasket having 1 mm.$^2$ cross-sectional area would have a total volume of 82 mm.$^3$. This total volume equates to 50 mg. of a fluxed vinyl chloride plastisol having a density of 0.6 mg./mm.$^3$.

In this illustration, the plastisol contained a chemical blowing agent and in its unfluxed state had a density of 1.22 mg./mm.$^3$ and when fluxed the gasket had a void volume of about 50%, thus accounting for the reduction in density of the fluxed gasket.

The greatest thickness of the gasket resides in that area of the skirt which is in close proximity to the skirt-panel juncture. While residence of some portion of the gasket is permissible in the juncture area, the amount should be held to a minimum because as the amount in the juncture increases there is a coresponding increase in the probability of score line rupture.

FIG. 5 shows the gasket in sealing engagement with the mouth of a bottle. As the closure is applied to the bottle to seal the contents thereof, the compression involved in the capping operation forces the gasket upwardly so that the secondary seal portion of the gasket is urged to seat on the outer edge of the bottle lip. Because of the resiliency of the gasket, there is constant pressure exerted in the primary sealing areas as well as the area adjacent the lower edge of the flange of the bottle. The distribution of the gasket into the latter area offers a point of resistance to twisting and abuse of the closure.

FIG. 6 illustrates the manner in which the gasket responds to the internal pressure on the overall cap. When the pressure from within the container, shown as arrow A, is exerted against the panel 11, it causes the panel to lift into a dome-like shape as shown by the broken line B. The doming effect urges the skirt inwardly around the mouth of the bottle, shown by the direction of arrows C, causing compression of the primary sealing area of the gasket against the outer surface of the bottle. Consequently, while the internal pressure may cause the secondary seal and panel to lift from the mouth of the bottle, there is a corresponding action which causes the primary seal to compress circumferentially inwardly thus assuring an effective seal at all times. In addition, such inward compression increases the resistance of the closure to twisting because of the increased contact of the gasket with an increased surface area of the container.

In preparing the gasketed closure, a sheet of flexible metal plate, such as aluminum or aluminum alloy, is provided. Since metallic contamination has the most drastic action on palatability of carbonated beverages, the metal surface is first coated with a lacquer or enamel to protect the contents in the container against such contamination. When the gasket is formed of a plastisol of a vinyl chloride resin, it is usual to coat the metal with a vinyl lacquer because of the compatibility of the vinyl components to insure adhesion of the gasket to the coating. The coating may be one which is derived from a lacquer containing a vinyl resin alone or in combination with one or more of oleoresinous, epoxy, acrylic or phenolic components. A satisfactory coating composition is one derived from polyvinyl chloride or a major amount of vinyl chloride copolymerized with up to about 20% by weight of vinyl acetate in combination with the aforementioned components.

The composition which is suitable in this invention to form the gasket is preferably a plastisol of a vinyl chloride polymer. This includes polyvinyl chloride or a major amount of vinyl chloride copolymerized with up to about 20% of vinyl acetate as the polymeric components. Although these polymers are preferred, other acid-resistant thermoplastic resins may be used. The latter include polyvinyl acetate, polyvinyl butyrate, polyvinyl alcohol, polyvinylidene chloride and copolymers of vinylidene chloride and a vinyl aromatic compound, such as styrene.

The plasticizer employed may be any of the well-known non-volatile liquid plasticizers for vinyl resins which solvate the resin at elevated temperatures. These include such primary plasticizers as dioctyl phthalate, disiooctyl phthalate, didecyl phthalate, di(n-octyl, n-decyl) phthalate, acetyl tributyl citrate, dioctyl sebacate, dihexyl adipate, dioctyl adipate, 2-ethylhexyldiphenyl phosphate, tricresyl phosphate, epoxidized triglycerides, such as epoxidized soybean oil and epoxidized castor oil, and epoxidized esters of lower alkyl alcohols and fatty acids, such as methyl-, ethyl-, propyl-, butyl-, and hexyl 9,10-epoxystearate; butyl 9,10,12,13 - diepoxystearate; butyl 9,10-epoxypalmitate, and butyl 12-hydroxy-9,10-epoxystearate. The amount of plasticizer used should range between about 50 and 150 parts by weight preferably between 65 and 110 parts per 100 parts by weight of the resin. Since the specific placement of the gasket in the closure depends on the viscosity of the plastisol, the viscosity must be within the range previously specified so that it will gravitate down the skirt of the shell without undue overlapping in the panel area. Therefore, the range of plasticizer specified will yield plastisols having the desired viscosity.

Since the primary intent of the plastisol is to form a gasket which is tough and resilient and, further, since the gasket when incorporated in closures which are primarily intended to be manually stripped from a container, it is necessary that the gasket tear easily to remove the closure from the container. This property is achieved by providing a cellular structure to the gasket obtained by incorporating air during the fluxing cycle, or preferably, by including a solid chemical blowing agent in the plastisol composition. Suitable agents include azodicarbonamide, 3,3' - disulphonhydrazido diphenylsulfone, dinitrosopentamethylene tetramine, diazoaminobenzene, and p,p'-oxybis (benzene sulfonyl hydrazide). In order to obtain a uniform cell structure in the gasket, it is necessary that the blowing agent be intimately and uniformly dispersed throughout the plastisol. This may be accomplished by grinding the blowing agent with a minor portion of the plasticizer prior to blending it into the plastisol composition. When the plastisol is subjected to fluxing temperatures in the range of 350 to 425° F., the blowing agent decomposes rapidly and thereby forms the desired cell structure in the gasket.

The average cell diameter of the gasket should range between about 5 and 10 mils and the void volume should range between about 15 and 65, preferably between 30 and 60 percent. When the void volume is below 15 percent, the gasket is too hard and when the volume is above 65 percent the cellular structure is uneven and the gasket lacks resistance to collapsing. These properties are obtained by including 0.5 to 2.0 percent of the blowing agent in the composition based on 100 parts by weight of the resin. The cell structure and the void volume endow the gasket with the desired degree of resiliency while improving its sealing efficiency. The resiliency imparts a softness to the gasket and prevents deformation of the radius of an aluminum closure. In addition, it aids in eliminating rupture of the score lines at the juncture where the skirt and periphery of the panel merge when the closure is subjected to high head pressures, i.e., of the order of about 720 p.s.i., during the capping operation. Still further, the cellular structure permits the use of low film weights in forming the gasket.

In addition to the resin, plasticizers and blowing agents, various other additives may be included to modify the plastisol compositions. These include bulk fillers, such as anhydrous calcium sulfate, talc, wood flour, asbestos, and calcium carbonate; stabilizers, such as tetrasodium pyrophosphate, tribasic lead silicate, dibasic lead stearate, organo-tin complexes, epoxy resins and epoxidized oils of fatty acids; pigments, such as a carbon black, titanium dioxide and aluminum powder; and dispersing agents, such as zinc resinate, lecithin glycol stearate, propylene glycol laurate and glycol monooleate.

A pseudo-plastic thickening agent is usually added in amounts of about 1 to 10 parts per 100 parts of resin to assist in controlling the rheological properties of the plastisol. Suitable thickening agents include metallic soaps, such as calcium and aluminum stearate, silica aerogel, diatomaceous earth and other materials having high oil-absorption qualities are also useful to control the consistency of the composition. One to 4 parts per 100 parts of resin of finely divided silica is quite effective for this purpose. Generally, the amount of plasticizer present influences the rheological properties of the plastisol to the greatest extent but the thickening agent also has an appreciable effect. Ultimately the rheological properties are such that the plastisol is immobilized against lateral flow onto the panel when it has gravitated to the panel-skirt juncture.

Closures are lined with the gasket-forming composition at speeds ranging between about 200 and 250 units per minute using a high speed automatic lining machine wherein the closures are spun on a rotating chuck beneath a pressure-dispensing nozzle. The nozzle delivers the composition to the closure intermittently in response to timed relation between the feeding and removal of the closures to and from the chuck. The nozzle should be tilted at a 30 to 45° angle from the vertical assure proper placement of the composition in the closure. The composition is placed at a point slightly above the horizontal center line of the skirt to avoid the possibility of breaking the score lines on the closure as well as to maximize twist and abuse resistance of the closure. The film weight of cellulated gaskets averages between about 50 and 150 mg. for 26 mm. closures and will vary with the size of the closure. The composition should be applied at a rate such that the closure has completed two rotations on the chuck. The two-turn lining of the closure minimizes overlap and underlap which might cause fracture of the score line and/or deformation of the cap. Film weight variations are held to within ±5%.

The temperature of the gasket-forming composition during lining ranges between about 105 and 115° F. to obtain a smooth flow and even distribution of film weights. The nozzle is heated by lamps to give uniform flow and sharp cut-off of composition between closure linings. By placing the composition above the horizontal center line of the skirt, an ideal configuration of the resulting gasket is obtained when the composition slumps during the fluxing phase.

Plastisols of vinyl chloride polymers which are useful in the practice of this invention are illustrated in the following Examples 1 to 3:

EXAMPLE 1

The composition was prepared step-wise according to the following procedure:

Step 1

The following ingredients were thoroughly mixed and then passed through a colloid mill having a setting of less than 0.015 inch:

| Ingredient: | Amount |
|---|---|
| Dioctyl phthalate (plasticizer) lbs | 1300 |
| Titanium dioxide (pigment) lbs | 140 |
| Hematite (pigment) lbs | 4 |
| Limonite (pigment) lbs | 3.2 |
| Carbon black (pigment) gms | 340 |
| Finely divided silica (thickening agent) lbs | 60 |

Step 2

1040 lbs. of the mixture of Step 1 and 100 lbs. of additional dioctyl phthalate were slowly stirred in a kettle heated to 110° F.

Step 3

416 lbs. of a wax solution at 110° F. were then added to the resulting mixture of Step 2. The solution consisted of a wax having a melting point ranging between 110 and 130° F. and additional dioctyl phthalate in a ratio of 4.65 lbs. of wax to 13.95 lbs. of phthalate.

Step 4

80 lbs. of diatomaceous earth and 62 lbs. of a mixture composed of zinc oxide and dioctyl phthalate were stirred in under vacuum to the product of Step 3. The ratio of zinc oxide to dioctyl phthalate was 1.04 lbs. to 4.16 lbs. respectively.

Step 5

2250 lbs. of polyvinyl chloride were slowly stirred in the mixture of Step 4 and mixing was continued for 15 minutes after all of the resin was added to assure uniformity. The vacuum was then released.

Step 6

46 lbs. of a blowing agent mixture together with 183 lbs. of diactyl phthalate were then added to the mixture of Step 5. The blowing agent mixture was composed of azodicarbonamide and dioctyl phthalate in a ratio of 1.34 lbs. of the former to 2.66 lbs. of the latter. The amount of blowing agent was sufficient to yield a fluxed gasket having a void volume of about 50%. A vacuum was then applied and the entire composition was stirred at high speed.

The final composition (4177 lbs.) had the following properties:

Color: Tan
Viscosity: 3,000–3,500 centipoises at 60 r.p.m. and 8,000–11,000 centipoises at 6 r.p.m. as measured by 110° F. on a Brookfield viscosimeter, Model LVF5X, No. 3 Spindle
Density: 1.22 mg./mm.$^3$ Examples 2 and 3 illustrate other representative compositions which are useful in the practice of this invention. They were prepared in a manner similar to the procedure described in Example 1:

EXAMPLE 2

| Ingredient: | Parts by weight |
|---|---|
| PVC resin | 100 |
| Di-octyl phthalate | 95 |
| Paraffin wax | 4.6 |
| Fine MgSiO$_3$ | 3.5 |
| Azodicarbonamide | 0.7 |
| Zinc oxide | 0.6 |
| Silica aerogel | 2.0 |
| Titanium dioxide | 17.6 |
| Carbon black | 0.04 |

EXAMPLE 3

| Ingredient: | Parts by weight |
|---|---|
| PVC resin | 100 |
| Di-octyl phthalate | 105 |
| Paraffin wax | 4.6 |
| Diatomaccous earth | 3.5 |
| Azodicarbonamide | 0.7 |
| Zinc oxide | 0.6 |
| Silica aerogel | 3.0 |
| Titanium dioxide | 5.6 |
| Hematite | 0.16 |
| Limonite | 0.13 |
| Carbon black | 0.03 |

The amount of composition and the effect of placement in the skirt of a closure on sealing performance was determined by conducting pasteurization and storage tests on carbonated tests on carbonated water at different levels of film weight. The closures used were the tear-type as illustrated in the drawing. In these tests, the placement of the gasket in the skirt (side seal) is compared with placements in the panel-skirt juncture (corner seal) and in the peripheral margin of the panel (top seal), the latter of which is adapted to seat exclusively on the mouth of a bottle. In each test, the gaskets were formed by fluxing a composition similar to that described in the Example 1 except that the plasticizer was used in amount of 105 parts per 100 parts by weight of resin. The film weight as shown in the tables represents the weight of a fluxed cellular gasket having a void volume of 40%.

The tests were carried out on a laboratory scale using bottles filled with a standard sulfuric acid solution to obtain the desired carbonation and adding sodium bicarbonate in gelatin capsules to delay reaction for a few minutes. The amounts of sulfuric acid solution and bicarbonate were sufficient to develop three gas volumes of carbon dioxide. Three tests were carried out with each placement using 50, 100 and 150 mg. of cellulated gasket in a 26-mm. cap.

Table I illustrates the behavior of the different placements of the gaskets and the film weights during capping and pasteurization. In carrying out the pasteurization test, a hot water bath is slowly brought to pasteurization temperature (140 to 145° F.), the bottles are held at this temperature for 20 minutes and then they are slowly cooled to room temperature and stored. The three top seal placements using 50, 100 and 150 mg. of gasket all leaked in the hot water bath at 100° F. The bottles were held at this temperature until the sodium bicarbonate was dissolved. These bottles were rejected and not fully pasteurized, indicating that a top seal placement on a tear-type closure was a complete failure.

Comparative data on the pasteurization test between the side seal and the corner seal are reflected in Table I. Twelve sealed bottles were used in the test.

TABLE I
[During heating of bath up to 144 F°.]

| Gasket placement | Weight of gasket, mg. | No. of leaking closures | Percent of leaking closures |
|---|---|---|---|
| Side seal | 50 | 0 | 0 |
| | 100 | 0 | 0 |
| | 150 | 1 | 8⅓ |
| Corner seal | 50 | 8 | 66⅔ |
| | 100 | 12 | 100 |
| | 150 | 8 | 66⅔ |

It was noted that those closures that started to leak continued leaking during pasteurization. During the cooling cycle from the pasteurization temperature to room temperature, one bottled closure containing 50 mg. of gasket in the corner seal and the remaining four corner seals containing 150 mg. of gasket leaked. It is significant that all closures having 100 and 150 mg. of sealing gasket in the corner and that 75% of those closures having 50 mg. of gasket in the corner leaked. On the other hand, only one out of 36 closures having a side seal leaked and this leakage could have occurred as a result of a number of factors, e.g., improper capping, undue overlap of the gasket into the panel-skirt juncture, etc.

The pasteurized bottles of each group as tested in Table I were further tested for carbonation retention after storage for one day and five weeks to determine sealing efficiency as a function of gasket placement and film weight. Table II gives the results of the storage tests on the bottles which were initially charged prior to pasteurization with three gas volumes of carbon dioxide.

is much more suited to closures formed of a light metal, such as aluminum. The gasket is deformed by a wiping action around the sealing surface of the glass and the gasket absorbs only the force needed to cause the closure to seal the bottle. If a cellular gasket is used, the cell TABLE II(a)

[One day storage]

| | Film weight | | | | | | | | |
|---|---|---|---|---|---|---|---|---|---|
| | 50 mg. | | | 100 mg. | | | 150 mg. | | |
| Gasket placement | Temp., °F. | Pressure, p.s.i. | Retained gas volume | Temp., °F. | Pressure, p.s.i. | Retained gas volume | Temp., °F. | Pressure, p.s.i. | Retained gas volume |
| Side seal | 69 | 35 | 2.85 | 66 | 33 | 2.90 | 60 | [1] 28 | 2.92 |
| | 69 | 36 | 2.90 | 66 | 28 | 2.60 | 60 | 29 | 2.95 |
| | 69 | 31 | 2.65 | 64 | 32 | 2.90 | 60 | 29 | 2.95 |
| | 69 | 35 | 2.85 | 60 | 32 | [2] 3.10 | 60 | 29 | 2.95 |
| | 69 | 35 | 2.85 | 60 | 32 | [2] 3.10 | 60 | 28 | 2.90 |
| | 69 | 33 | 2.75 | 60 | 30 | 3.00 | 60 | 28 | 2.90 |
| Average retained gas volume | | | 2.81 | | | 2.93 | | | 2.92 |
| Corner seal | 60 | [1] 21 | 2.40 | 70 | [1] 33 | 2.75 | 70 | [1] 34 | 2.80 |
| | 60 | [1] 24 | 2.60 | 70 | [1] 29 | 2.45 | 70 | [1] 30 | 2.50 |
| | 60 | [1] 19 | 2.25 | 70 | [1] 25 | 2.25 | 70 | [1] 35 | 2.85 |
| | 60 | 28 | 2.70 | 70 | [1] 28 | 2.40 | 70 | [1] 33 | 2.75 |
| | 60 | 28 | 2.90 | 70 | [1] 33 | 2.75 | 70 | [1] 32 | 2.70 |
| | 60 | [1] 25 | 2.65 | 70 | [1] 31 | 2.60 | 70 | [1] 33 | 2.75 |
| Average retained gas volume | | | 2.58 | | | 2.53 | | | 2.70 |

[1] Leaked during pasteurization.  [2] Gas volume measurement due to analytical error.

TABLE II(b)

[Five weeks storage]

| | Film weight | | | | | | | | |
|---|---|---|---|---|---|---|---|---|---|
| | 50 mg. | | | 100 mg. | | | 150 mg. | | |
| Gasket placement | Temp., °F. | Pressure, p.s.i. | Retained gas volume | Temp., °F. | Pressure, p.s.i. | Retained gas volume | Temp., °F. | Pressure, p.s.i. | Retained gas volume |
| Side seal | 70 | 34 | 2.80 | 70 | 33 | 2.70 | 68 | 33 | 2.75 |
| | 70 | 33 | 2.75 | 70 | 34 | 2.80 | 68 | 33 | 2.75 |
| | 70 | 34 | 2.80 | 70 | 34 | 2.80 | 68 | 32 | 2.70 |
| | 70 | 33 | 2.75 | 70 | 32 | 2.70 | 68 | 33 | 2.75 |
| | 70 | 33 | 2.75 | 70 | 33 | 2.75 | 68 | 33 | 2.75 |
| | 70 | 34 | 2.80 | 70 | 34 | 2.80 | 68 | 33 | 2.75 |
| Average retained gas volume | | | 2.77 | | | 2.77 | | | 2.74 |
| Corner seal | 70 | [1] 32 | 2.70 | 68 | [1] 30 | 2.60 | 68 | [1] 31 | 2.65 |
| | 70 | [1] 13 | 1.55 | 68 | [1] 24 | 2.30 | 68 | [1] 28 | 2.50 |
| | 70 | [1] 32 | 2.70 | 68 | [1] 20 | 2.00 | 68 | [1] 29 | 2.55 |
| | 70 | [1] 10 | 1.40 | 68 | [1] 22 | 2.20 | 68 | [1] 28 | 2.50 |
| | 70 | [1] 18 | 1.90 | 68 | [1] 26 | 2.40 | 68 | [1] 21 | 2.05 |
| | 70 | [1] 28 | 2.40 | 68 | [1] 14 | 1.70 | 68 | [1] 28 | 2.50 |
| Average retained gas volume | | | 2.12 | | | 2.20 | | | 2.46 |

[1] Leaked during pasteurization.

Carbonation-retention properties of closures during product storage is one of the more important performance characteristics of sealing gaskets. The pressures at which sealed carbonated beverages will leak are of some importance, although the results of a direct pressure-holding test will not always establish a reciprocal relation with storage-leakage tests. If the leakage pressure is excessively low, some difficulty with loss of gas on storage of the bottled beverage can be anticipated. However, the bottles should leak (or vent) at excessively high pressure to reduce the possibility of breakage due to accidental heating of the bottles to a high temperature, such as exposure to direct sunlight.

The performance of the side-seal closures of this invention shows marked improvement over a corner seal as illustrated in the tables. These results indicate the superiority of the side seal at film weights of 50, 100 and 150 mg. in a 26 mm. tear-type closure. In particular, the side seal at 50 mg. out-performed the corner seal at 150 mg. in sealing efficiency. In addition, the use of low film weights presents an economic advantage.

The most effective side seal does not cover the entire primary sealing area when the closure is capped to a bottle. It is centered in this area and has the shape of a teardrop in cross-section. This represents a departure from the conventional sealing mechanism of the corner seal and top seal which receive the vertical force of capping and absorb it in the compression of the gasket. The direct vertical force subjects the score lines to rupture.

The teardrop side seal, on the other hand, redirects the vertical force to a horizontal force or compression which formation is not totally collapsed and easily follows the deformation of the metal of which the closure is formed.

While this invention has been described with respect to closures having a score-lined section for manually stripping the closure for a container, it is also applicable to other non-rotatable skirted crimp, press-on, or roll-on closures, such as crowns and the like.

I claim:

1. A closure element for sealing containers comprising a closure shell composed of a central panel, a curved juncture portion and a skirt depending from the periphery thereof, a tear section defined on said shell and continuing from the peripheral edge of the skirt for a distance across the central panel, a tab operatively associated with said tear section, and a sealing gasket secured exclusively to the inner surface of the skirt from a midpoint of the skirt down to the juncture portion, said gasket having a cross-sectional area between about 1 mm.$^2$ and 5 mm.$^2$.

2. A closure element according to claim 1 wherein the gasket is a fluxed plastisol of a vinyl chloride polymer.

3. A closure element acording to claim 2 wherein the gasket has a cellular structure.

4. A closure element according to claim 3 wherein the gasket has a cellular structure with a void volume ranging between about 15 and 65 percent.

5. A closure element according to claim 4 wherein the average cell diameter ranges between about 5 and 10 mils.

(References on following page)

References Cited

UNITED STATES PATENTS

| | | | |
|---|---|---|---|
| 2,733,827 | 2/1956 | Foye | 215—40 |
| 2,982,433 | 5/1961 | Chaplin | 215—40 |
| 3,092,280 | 6/1963 | Ford | 215—40 |
| 3,202,307 | 8/1965 | Rainer et al. | 215—39 |
| 3,216,602 | 11/1965 | Koll | 215—46 |

DONALD F. NORTON, *Primary Examiner.*

U.S. Cl. X.R.

215—46